US012222993B1

(12) United States Patent
Stephen et al.

(10) Patent No.: US 12,222,993 B1
(45) Date of Patent: *Feb. 11, 2025

(54) RESOLVING POINTS OF INTEREST BY TEXT STYLIZATION (71) Applicant: Freedom Scientific, Inc., Clearwater, FL (US)

(72) Inventors: Joseph Kelton Stephen, Winkleigh (AU); Glen Gordon, Madison, WI (US); Roxana Fischer, Rotterdam (NL)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,930

(22) Filed: Jul. 20, 2023

Related U.S. Application Data (63) Continuation of application No. 17/716,357, filed on Apr. 8, 2022, now Pat. No. 11,709,898.

(51) Int. Cl.
G06F 16/93 (2019.01)
G06F 3/0481 (2022.01)
G06F 16/13 (2019.01)
G06F 16/957 (2019.01)
G06F 16/958 (2019.01)
G06F 40/14 (2020.01)

(52) U.S. Cl.
CPC ............ *G06F 16/93* (2019.01); *G06F 3/0481* (2013.01); *G06F 16/13* (2019.01); *G06F 16/9577* (2019.01); *G06F 16/986* (2019.01); *G06F 40/14* (2020.01)

(58) Field of Classification Search
CPC ..... G06T 11/60; G09B 21/007; G06F 40/103; G06F 40/109; G06F 40/117; G06F 40/143; G06F 16/93; G06F 16/9577; G06F 16/986; G06F 16/13; G06F 3/0484; G06F 40/14
See application file for complete search history.

(56) References Cited

U.S. PATENT DOCUMENTS

| 9,411,581 B2 * | 8/2016 | Peled ........................ G06F 8/51 |
| 10,845,978 B1 * | 11/2020 | Karppanen ........... G06F 40/194 |
| 11,709,898 B1 * | 7/2023 | Stephen ............... G09B 21/007 |
| | | 707/781 |
| 2013/0124080 A1 * | 5/2013 | Diao .................... G01C 21/362 |
| | | 701/400 |

(Continued)

*Primary Examiner* — Marcin R Filipczyk
(74) *Attorney, Agent, or Firm* — Dennemeyer & Associates LLC (57) ABSTRACT A screen reader application traverses each node in a document object model (DOM) for the text stylization. Properties for foreground color, background color, font type, font size and font stylization are algorithmically reduced to an identifier. Each node in the DOM with the same identifier has the same text stylization. Unique and infrequent text stylizations by a webpage author signal a point of interest. The screen reader application locates and navigates to that node in the DOM on behalf or in response to the end user. Points of interest are further identified by a number of additional factors. A first includes percentage of text of having the text stylization versus total text in the DOM. A second includes excluding candidate point of interest nodes having more than 250 characters. Others include imposing minimum font sizes and text contrast ratios to qualify as a point of interest.

20 Claims, 5 Drawing Sheets (56) References Cited

U.S. PATENT DOCUMENTS

| | | | | |
|---|---|---|---|---|
| 2015/0317404 A1* | 11/2015 | Hibbs | .................. | G09B 21/006 |
| | | | | 715/234 |
| 2019/0122579 A1* | 4/2019 | Blakey | ................. | G09B 21/005 |
| 2020/0175961 A1* | 6/2020 | Thomson | ................ | G10L 15/28 |

* cited by examiner

RESOLVING POINTS OF INTEREST BY TEXT STYLIZATION

CROSS REFERENCE TO RELATED APPLICATION

This application is a continuation of claims priority to co-pending U.S. Non-Provisional patent application Ser. No. 17/716,357 filed Apr. 8, 2022, and entitled "Detecting Points of Interest by Atypical Stylization."

BACKGROUND OF THE INVENTION

1. Field of the Invention

The described embodiments relate generally to screen reader software enhancements. Specifically, the described embodiments relate to systems and methods for identifying and presenting points of interest in a document object model (DOM) based on atypical text stylization.

2. Brief Description of the Related Art

Accessible Rich Internet Applications (ARIA) is a collection of attributes that define ways to make web content and web applications (particularly those developed with JavaScript) more accessible to people with disabilities. ARIA supplements HTML so that interactions and widgets frequently used in applications are sent to assistive technologies when there is not otherwise a mechanism. ARIA enables such things as accessible JavaScript widgets, form hints and error messages, live content updates, and more. Often, webpage developers will use text or background colors, different fonts, or certain text attributes to draw attention to text on a page. This text may be part of a chart or dashboard and may indicate status of an option. Authors frequently create markup that fails to use ARIA in an optimum manner. Accordingly, blind users often miss information that is nevertheless conveyed by stylized content.

BRIEF SUMMARY OF THE INVENTION

The Document Object Model (DOM) is a cross-platform and language-agnostic interface that models an XML or HTML document as a tree structure. Each node in the tree is an object representing a part of the document. The DOM is a document with a logical tree. All elements of the DOM are considered nodes, with the most common node types being Element, Attribute and Text. Element nodes can themselves have children, Attribute and Text nodes cannot. So, most DOM branches terminate with an element node which in turn contain one or more text nodes. DOM methods enable programmatic access to the tree. With this access, developers may change the structure, style, or content of a document.

The present invention analyzes the DOM of a web page and ranks textual content in reverse order based upon the infrequency of its color, text attribute or font usage on the page. Colors, fonts, or attributes used least will rank highest as potential points of interest. On page load or by a dynamic update, all text nodes in the DOM are traversed. Their length, color, text attributes and font information are ranked. The nodes are then sorted by the least frequent color combination, text attribute, font, and length of node content (e.g., atypical stylization).

Additional parameters may be considered when analyzing the DOM and determining whether a node constitutes a point of interest. First, the total amount of text with a given set of attributes as compared to the total of the page as a percentage. If the total amount of text with the given attributes and font characteristics is greater than this threshold, text with these characteristics shall not be considered a point of interest. Second, the maximum run length of a given attribute is determined. If the maximum run length of text with a given set of attributes and font characteristics is greater than this value, any text with such attributes shall not be considered a point of interest. Third, the minimum font size is predefined such that text with fonts smaller than this value are presumably not points of interest.

Finally, a luminance ratio of text to background color is set. This ratio specifies the optimal contrast of text on web pages. If something is grayed out, its luminance ratio is typically lower than for text which is authored to stand out. Text with a luminance contrast ratio less than this configurable value shall not be considered a point of interest on the page. Note that this ratio is a value from 0 to 21 with 0 being completely dark and 21 being completely light. A ratio of 4.5 is recommended for good readability for normal sized text and a value of 3 is recommended for large text.

As a software product, the invention embodies a non-transitory computer-readable medium having stored thereon computer-executable instructions that, in response to being executed by a computing device, cause the computing device to perform operations. These operations include accessing a document object model (DOM) of a web page, the DOM having a plurality of nodes. Each node in the DOM is traversed for a collection of text attribute properties of each node in the DOM, the text attribute properties in the collection selected from the group consisting of foreground color, background color, font type, font size and font stylization. Each collection of text attribute properties is reduced to a style identifier whereby nodes in the DOM with identical text attribute properties have the same style identifier. The style identifier may be the literal string of the text attributes or may be an algorithmic reduction of the collection of text attribute properties to a compact identifier such as a checksum function or hash function digest. An atypical style identifier is determined based on its frequently of appearance in the nodes in the DOM and all the nodes in the DOM matching the atypical style identifier are marked whereby a screen reader application is operable to navigate directly to those matching nodes in the DOM.

Several filters may be deployed to efficiently return the most pertinent points of interest. These include the amount of text with the style identifier as a percentage of text (of any style) for the entire DOM, a maximum text length value of a node having the style identifier, a minimum font size threshold, and a luminance contrast ratio of text color to background color. Specifically, a valid range for the percentage of text for the entire DOM is set between 1 and 30 percent whereby if the amount to text with the style identifier as a percentage of text for the entire DOM falls outside the valid range text strings in the DOM having the style identifier are excluded from being marked for the screen reader application. The maximum text length value of a node in the DOM having the style identifier is set at 250 characters whereby if any nodes with the styler identifier in the DOM have a text length value in excess of 250 characters, then text strings in the DOM having the style identifier are excluded from being marked for the screen reader application. The minimum font size threshold is set at 9 points whereby if the style identifier includes a font size under 9 points the style identifier is excluded from being marked for the screen reader application. The minimum a luminance contrast ratio of text color to background color is set at 2% whereby if the style identifier includes a luminance contrast radio under 2% the style identifier is excluded from being marked for the screen reader application.

The screen reader application (e.g., JAWS developed by Freedom Scientific, Inc.) includes instructions to cause it to announce the number of marked nodes having the atypical style identifier in the DOM. Furthermore, it navigates to each marked node having the atypical style identifier in the DOM responsive to a predefined keystroke or keystroke combination. Finally, the screen reader broadcasts audio responsive to navigation to each marked node having the atypical style identifier in the DOM.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
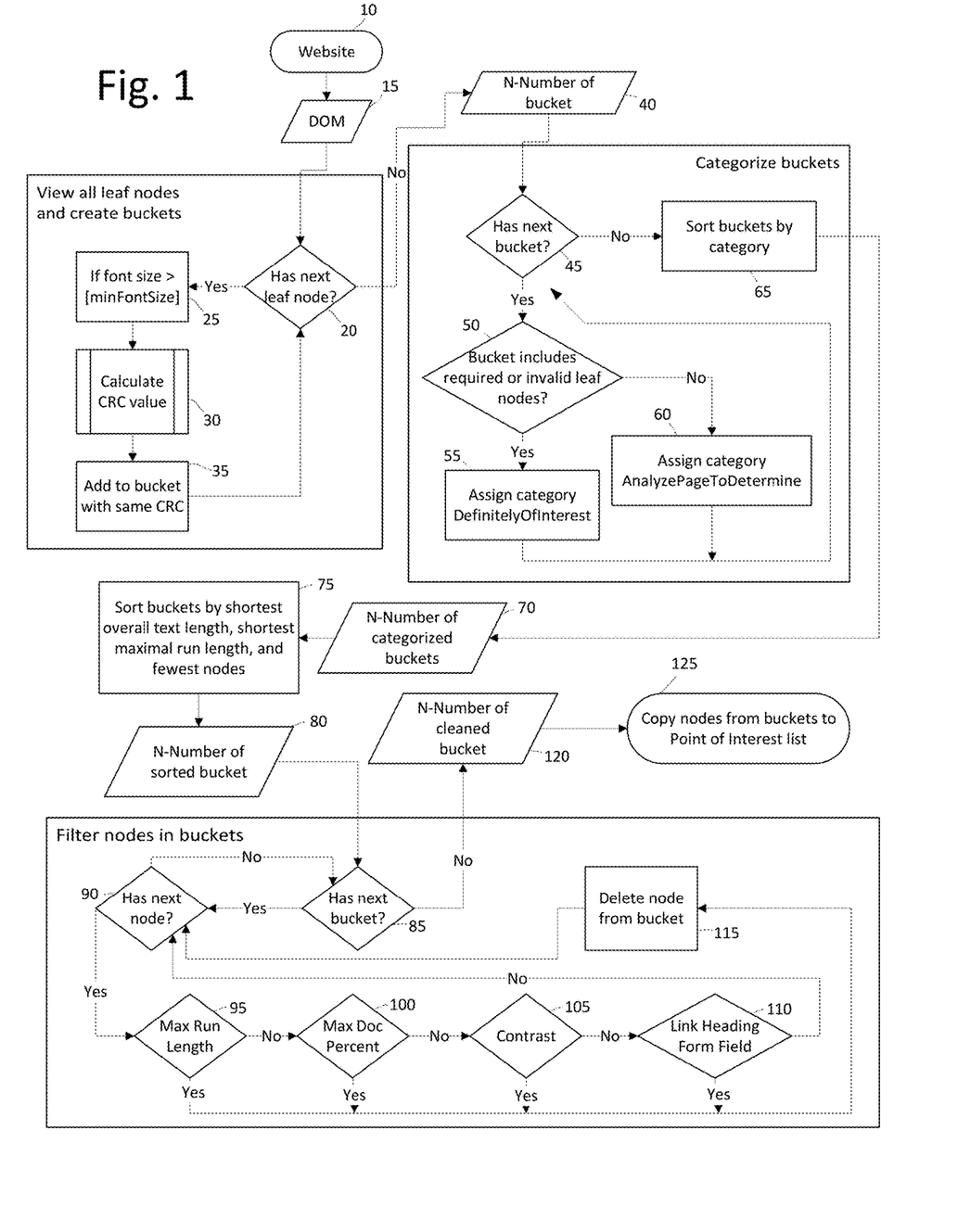
FIG. 1 is a flowchart process view of an embodiment of the invention.

Turning to FIG. 1, a website 10 serves a webpage conforming to the document object model (DOM) 15. The webpage is a document that can be either displayed in the browser window or as the HyperText Markup Language (HTML) source. In either case, it is the same document but the DOM representation allows it to be manipulated. As an object-oriented representation of the webpage, it can be modified with a scripting language such as JavaScript. Programs like a screen reader can interact with the page in a predictable, organized manner.

According to an embodiment of the current invention, all the leaf nodes in the DOM are traversed and buckets are created according to the node properties. First, the process determines if there is another leaf node 20. If so, it determines 25 whether the font size specified in the node is larger than a minimum constant value. For example, font sizes below nine (9) points are less prominent and it is unlikely a website author would size text so small if it was intended to be a point of interest. Rather, smaller text may be "boilerplate" or common content not particularly intended to attract the attention of the end user.

Next, a checksum is calculated 30 for the node. This algorithmic reduction of the node stylization is more performant that comparing and storing the full stylization strings in this process. While checksum (CRC) functions may be used, other algorithmic processes like hashes and the like may be used to derive a unique or substantially unique identifier for the node stylization. The CRC is based on text attributes, font name, size and color. Nodes with the same CRC values are grouped 35 into the same buckets for analysis. After all the leaf nodes have been processed, the screen reader determines there are N-Number of buckets 40 having unique node text stylization. For example, if there are ten (10) different styles of text within a DOM there would be ten buckets held in process 40.

The bucket is assigned a category based on the nodes it contains. If, based on the attributes, it is known up front that the node is of interest then it is assigned a category denoted DefinitelyOfInterest. Alternatively, if further analysis is required of the rest of the page to determine if it is of interest, it is assigned a category of AnalyzePageToDetermine 60. If the bucket contains required form fields or an invalid form field 50 the category is set to DefinitelyOfInterest 55. For invalid formfields or other elements they are automatically presumed of interest, the category is set to DefinitelyOfInterest. As nodes are added to the appropriate bucket, the overall text length and a maximum run length for that font/attribute combination (represented by its CRC) is tallied for the bucket wherein N-Number of categorized buckets 70 are available after this process.

Next, the buckets are sorted by shortest overall text length, shortest maximal run length and fewest nodes 75. Iterate the buckets 80 in order and discard any which now fall outside configured parameters, e.g. where maximum consecutive run length with a given font exceeds the configured threshold (e.g. 100 characters), the total amount of text with the particular font exceeds the configured total length threshold (e.g. 15% of the entire document), where bucket foreground to background color contrast 105 (luminance) falls outside the configured threshold (less than 2%, recommended value is 4.5% for good contrast, see Guideline 1.4.3 of W3C Recommendation 11 published December 2008 for definition of luminance. Specifically, the filters include maximum run length 95, maximum percentage within the DOM 100, contrast ratio 105 and link heading form field 110. Nodes not meeting these criteria are deleted 115 from the bucket. The cleaned buckets 120 are then copied to a point of interest list 125.

There is also a means of moving to the nodes on the page either in logical (location) order, or in recent chronological order, i.e. move to the node which is of interest which was updated most recently in time, i.e. when a webpage is dynamically updated, the nodes (or parts of the page) which are updated have the update time recorded in them so the nodes are sorted in most recent to most distant update if such a node is deemed a point of interest. In other words, when a node is created or dynamically updated as part of building the document, its mostRecentUpdateTime is recorded. When searching for points of interest, the points of interest are further sorted in the document by most recent update time. Thus, there are three ways of looking at a point of interest: (1) its priority as determined by the algorithm, i.e., how interesting is it; (2) its logical position in the document, it is interesting, but visit it in location order; and (3) visit it in most recent update order.

Figure 2:
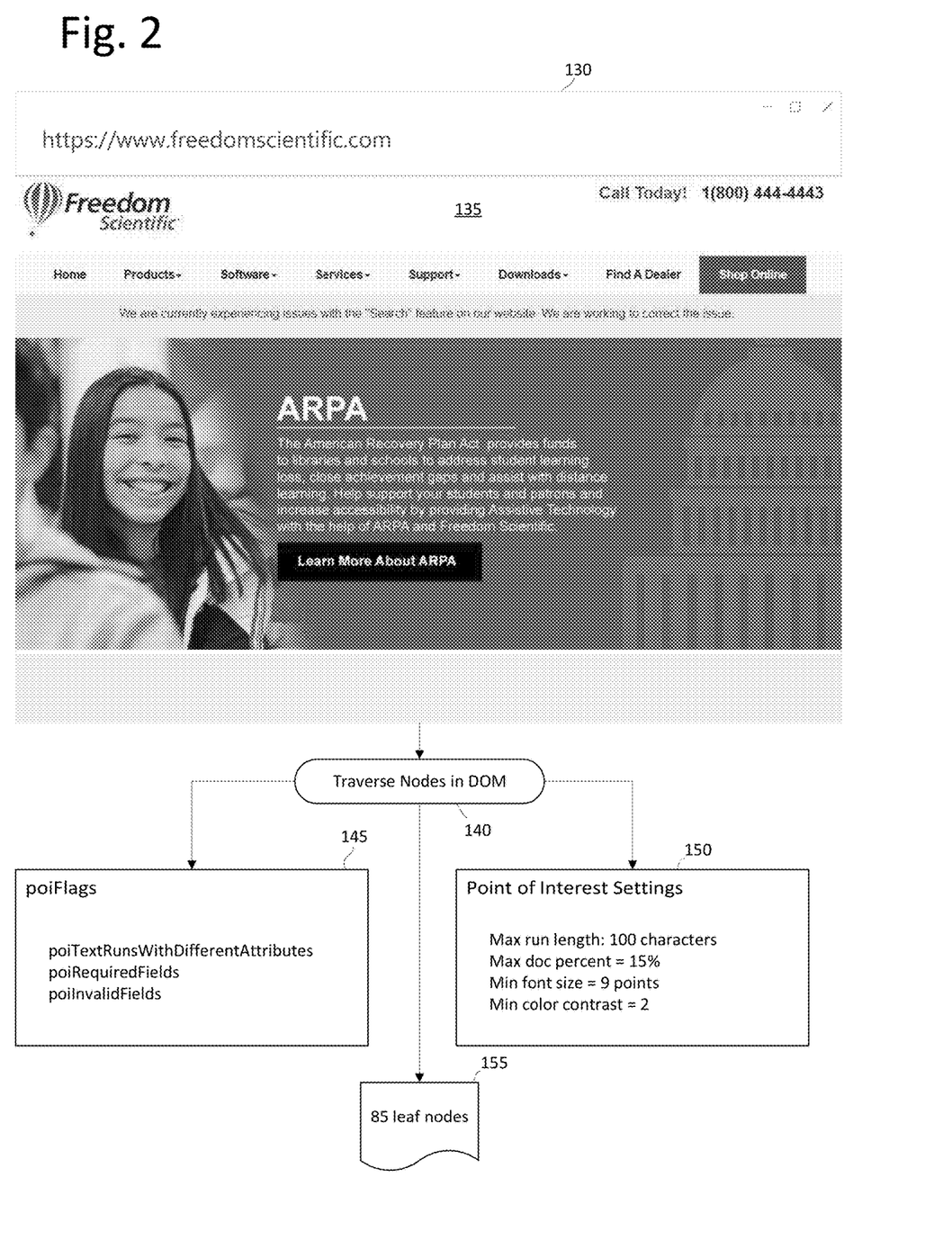
FIG. 2 is a diagrammatic representation of the initiation of an embodiment of the invention on a webpage.

FIGS. 2-5 show an example application of an embodiment of the invention on Applicant's own website 135. It should be noted that the JAWS screen reader developed by Applicant can already receive certain keystroke to navigate around the page to locate headings, links, tables and form fields. However, the present invention finds points of interest on a page based on visual queues rather than accessible markup. In FIG. 2, a browser 130 displays a web page visual but the screen reader software must first traverse nodes in the DOM 140 to provide non-visual analysis for the low-vision or blind user of the software. Certain points of interest flags (poiFlags) 145 are denoted by text runs with different attributes, required form fields and form fields in an invalid validation state (e.g., letters entered into a numeric field). Point of interest settings 150 may include default and user-definable products that include maximum run length of text, the maximum amount of text the node includes as a percentage of the overall document, the minimum font size to include as a possible point of interest and a minimal color contrast ratio. For the webpage 135 processed in this example, 85 leaf nodes were traversed 155.

Figure 3:
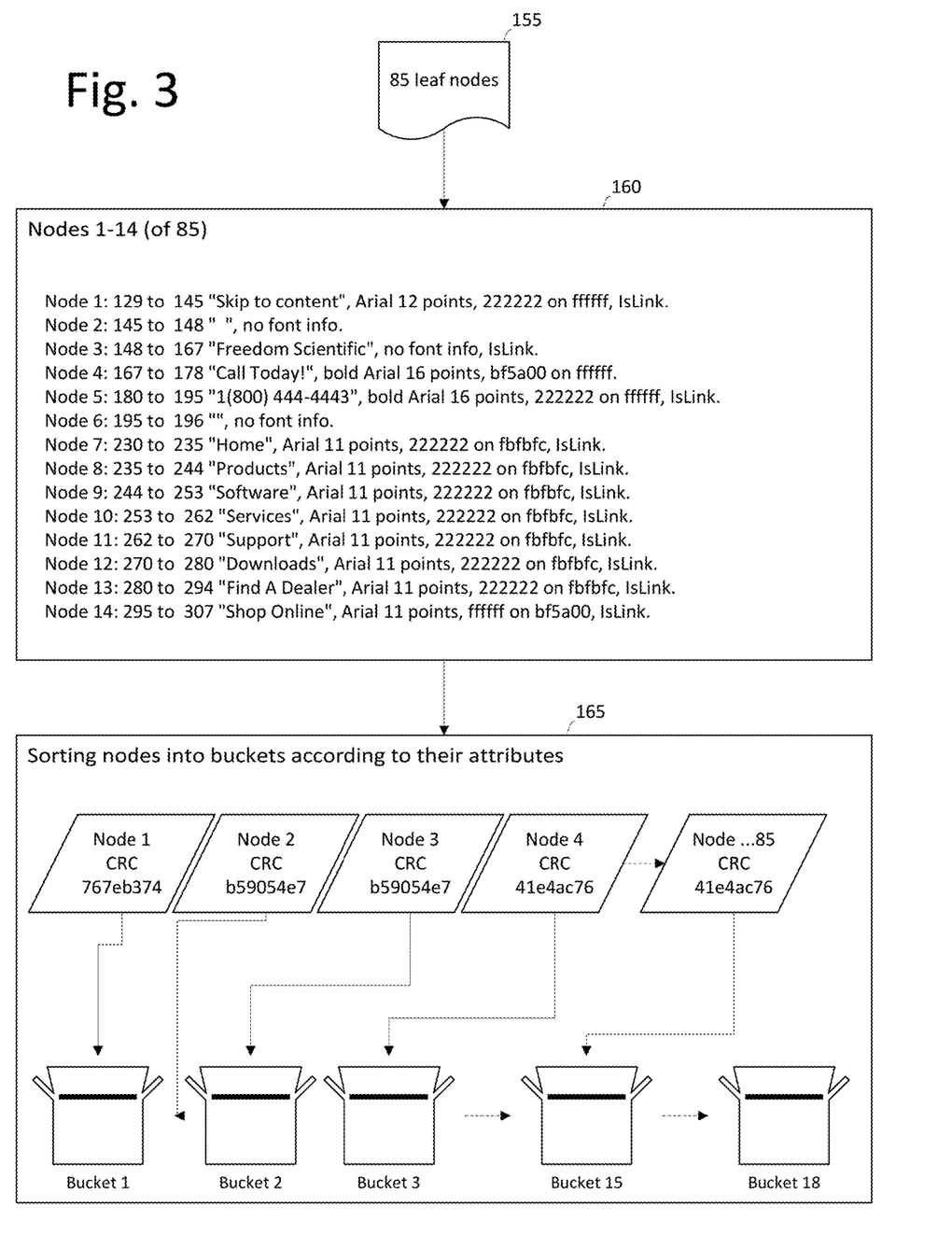
FIG. 3 is a diagrammatic view of the processing output and grouping of nodes in a DOM according to text stylization.

Turning to FIG. 3, each leaf node is analyzed for its text content 160. Nodes 1-14 are shown of the 85 total traversed. Each node position in the DOM is noted with the text content (if any), the font stylization and whether the text is a hyperlink to another resource. In the sorting step 165, a CRC value is generated for the text stylization of the node. Nodes 1-4 of the 85 are presented in additional detail. For example, nodes 2 and 3 have no font or custom text stylization. Accordingly, they are identical with respect to stylization and the resultant CRC values are the same (e.g., b59054e7). However, note that node 1 and node 5 save the same font stylization with one exception, node 1 uses 12-point size font while node 5 uses 16-point size font. Accordingly, because they are not truly identical with respect to text stylization, they have different CRC values. Nodes with the same CRC are grouped into the same buckets. In the sorting step 165, nodes 2 and 3 share the same bucket as their CRC codes are identical. In total, 18 buckets were generated out of the 85 nodes traversed. That means that there were 18 unique text stylization profiles to group together. Some buckets contain more matching nodes than others.

Figure 4:
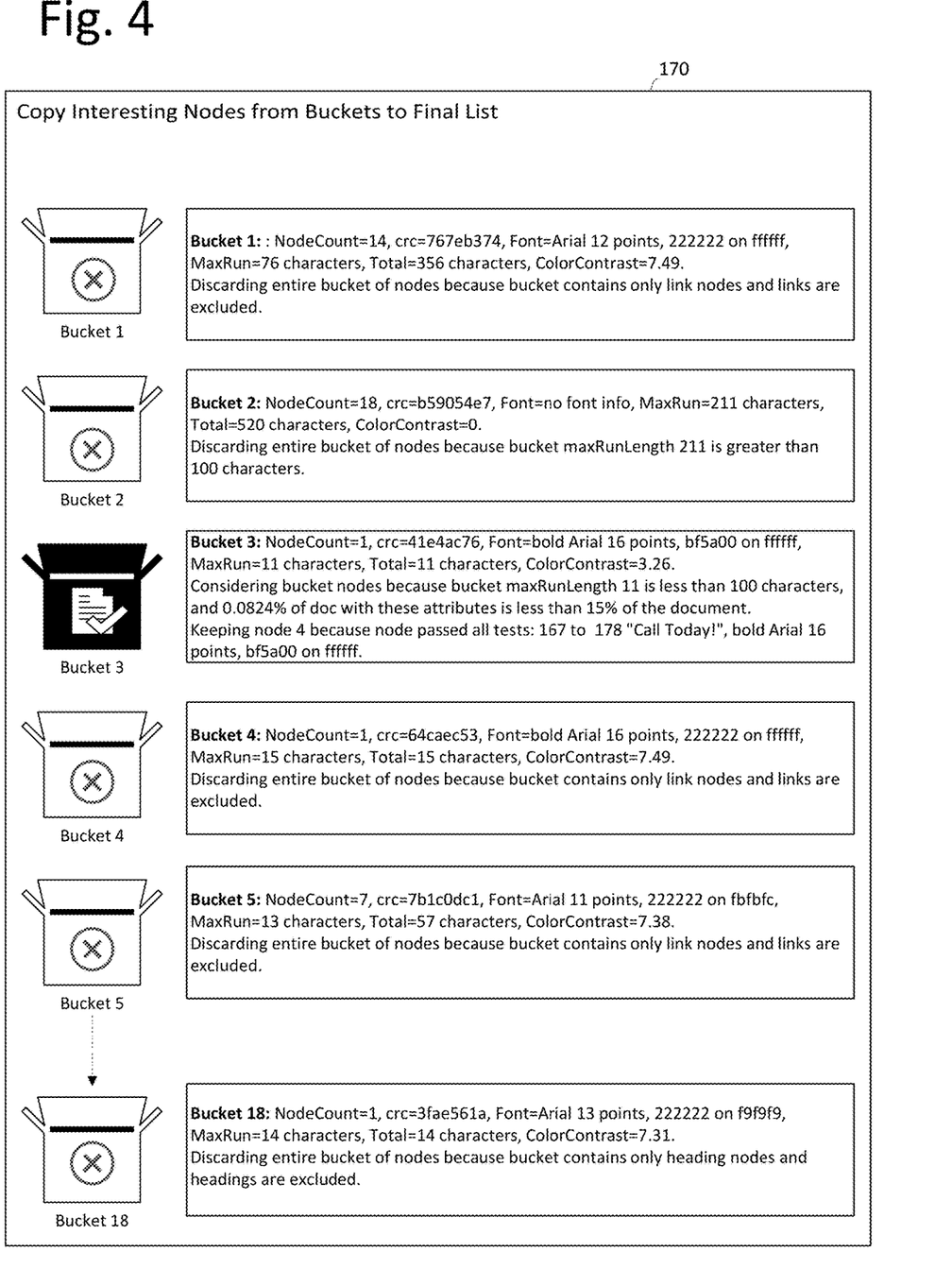
FIG. 4 is a diagrammatic view of filtering groupings of nodes by text stylization wherein only nodes passing the filtering process are denoted as points of interest.

In FIG. 4, the final list is generated by copying interesting nodes from buckets 170. This is a filter process. For example, an entire bucket of nodes is discarded from making the final list if the bucket contains only link nodes. If the bucket contains only heading nodes the entire bucket is discarded. If the nodes in a bucket have a color contrast less than 2% the entire bucket is discarded. If the maximum run length is greater than 100 characters (from the settings 150 in FIG. 2) then the bucket is discarded. In our example, only a single node (node 4) made it into bucket 3. The length of the text was 11 characters. Since it was the only node, the aggregate maximum run length was also 11, well below the settings threshold of 100 characters. The color contrast of node 4 was 3.26% which is above the threshold of 2%. The 11 characters of node 4 represent 0.0824% of the total characters in the document. That is less than the 15% threshold set in the settings. Accordingly, node 4 qualifies as a point of interest passing all the tests.

Figure 5:
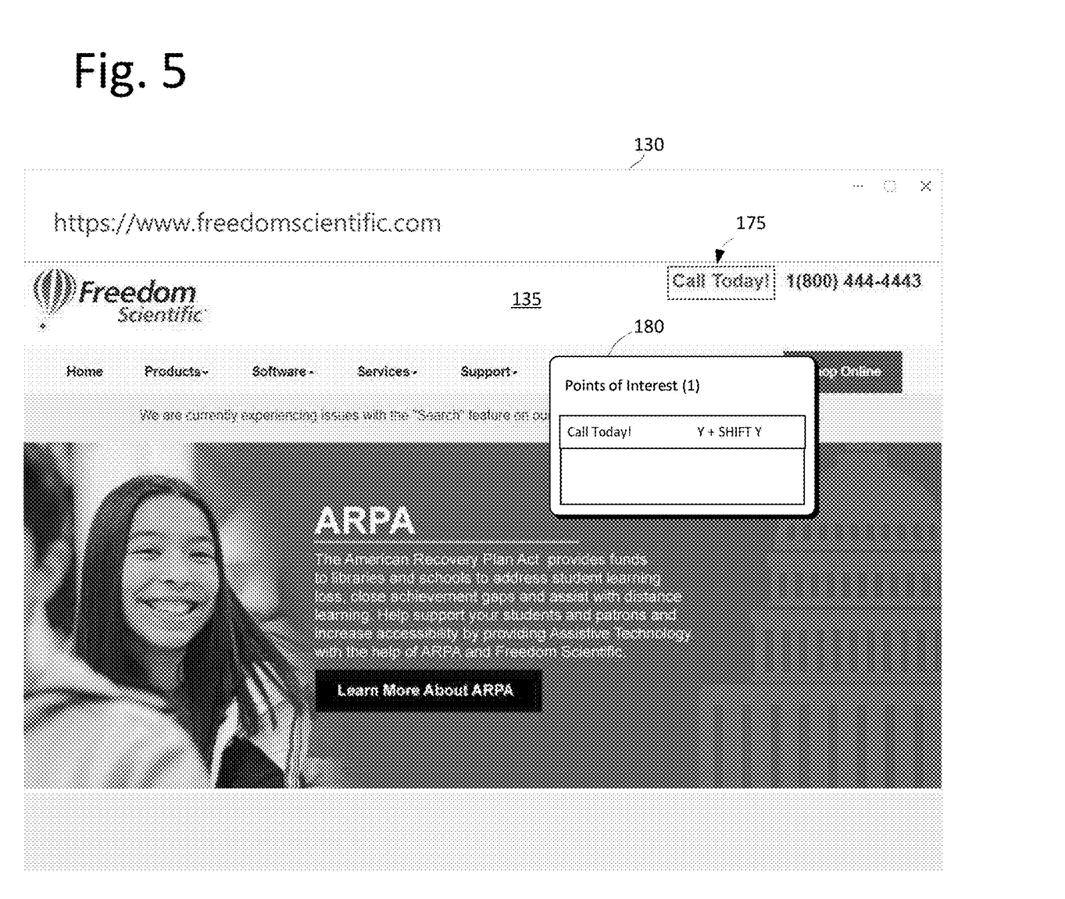
FIG. 5 is a diagrammatic view of the originally processed webpage showing the identification of the node that passed the grouping and filtering process to be a point of interest according to the invention.

FIG. 5 shows the webpage 135 through browser 130 wherein the point of interest 175 from node 4 is noted in dialog box 180. Low-vision and blind users may be presented with a list of points of interest (audibly or through Braille). They may also navigate through points of interest (typically with predefined keystroke combinations). A significant advantage of the present invention is the automatic translation and identification of unique stylization features of text for end users that otherwise would not be able to discern this information. This improves the productivity of low-vision and blind users in finding important information in webpage content more swiftly and efficiently.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Atypical style identifier means a collection or representative value of text attributes properties in a node of a DOM marked as a point of interest under the present invention.

Checksum function (or CRC) is a small-sized block of data derived a larger collection of data. This is one method of generating the compact identifier (defined below).

Compact identifier means an algorithmic reduction of the collection of text attribute properties. Text segments with the same color, font, size and attributes generates the same compact identifier. Text with a different font generate a different compact identifier.

DOM means document object model. DOM is a cross-platform and language-agnostic interface that models an XML or HTML document as a tree structure.

Hash function is an algorithmic function to map data to fixed-sized values. In the present invention, a hash function may be used to generate a compact identifier (e.g., a digest) to more efficiently find common styles of nodes in the DOM.

HTML means HyperText Markup Language. It is a core building block of the web. It defines both meaning and structure of web content.

Luminance contrast ratio means the contrast between a background color with a foreground text color.

Node means any object in the DOM, typically representing an HTML element including attributes such as id, class, title, style and the like. The topmost node is the root node (document node) of the DOM tree.

Point of interest means a mark or bookmark to a node within a DOM that is readable by a screen reader application to allow a low-vision or blind user to find, navigate, broadcast and/or enumerate the content and number of matching nodes without having to consume other content in the DOM.

Screen reader means an assistive technology for people with vision impairments. It renders text and image data on a computer to speech or braille output. An example of a screen reader is sold under the brand name JAWS and produced by Freedom Scientific, Inc.

Style identifier mean a collection or representative value of text attributes properties in a node of a DOM whereby nodes with the exact same text attribute properties have the same style identifier.

Web page means a hypertext document on the World Wide Web.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A non-transitory computer-readable medium having stored thereon computer-executable instructions that, in response to being executed by a computing device, cause the computing device to perform operations comprising:
   accessing a document object model (DOM) of a web page, the DOM having a plurality of nodes;
   automatically traversing each node in the DOM for a collection of at least two text attribute properties of each node in the DOM, the text attribute properties in the collection selected from the group consisting of foreground color, background color, font type, font size and font stylization;
   reducing each collection of text attribute properties to a style identifier whereby nodes in the DOM with identical text attribute properties have the same style identifier;
   determining an atypical style identifier based on its frequency of appearance in the nodes in the DOM; and
   marking all the nodes in the DOM matching the atypical style identifier whereby a screen reader application is operable to navigate directly to those matching nodes in the DOM wherein the screen reader outputs Braille or audio.

2. The computer-readable medium of claim 1 wherein the atypical style identifier is further determined from the group of factors consisting of an amount of text with the style identifier as a percentage of text for the entire DOM, a maximum text length value of a node having the style identifier, a minimum font size threshold, and a luminance contrast ratio of text color to background color.

3. The computer-readable medium of claim 2 wherein a valid range for the percentage of text for the entire DOM is between 1 and 30 percent where if the amount to text with the style identifier as a percentage of text for the entire DOM falls outside the valid range text strings in the DOM having the style identifier are excluded from being marked for the screen reader application.

4. The computer-readable medium of claim 2 wherein the maximum text length value of a node in the DOM having the style identifier is 250 characters whereby if any nodes with the style identifier in the DOM have a text length value in excess of 250 characters then text strings in the DOM having the style identifier are excluded from being marked for the screen reader application.

5. The computer-readable medium of claim 2 wherein the minimum font size threshold is 9 points whereby if the style identifier includes a font size under 9 points the style identifier is excluded from being marked for the screen reader application.

6. The computer-readable medium of claim 2 wherein the minimum a luminance contrast ratio of text color to background color is 2 whereby if the style identifier includes a luminance contrast radio under 2 the style identifier is excluded from being marked for the screen reader application.

7. The computer-readable medium of claim 1 wherein the style identifier is an algorithmic reduction of the collection of text attribute properties to a compact identifier.

8. The computer-readable medium of claim 7 wherein the algorithmic reduction is performed by a checksum function.

9. The computer-readable medium of claim 7 wherein the algorithmic reduction is performed by a hash function.

10. The computer-readable medium of claim 1 further comprising instructions to cause the screen reader application to announce the number of marked nodes having the atypical style identifier in the DOM.

11. The computer-readable medium of claim 1 further comprising instructions to cause the screen reader application to navigate to each marked node having the atypical style identifier in the DOM responsive to a predefined keystroke or keystroke combination.

12. The computer-readable medium of claim 1 further comprising instructions to cause the screen reader application to broadcast audio responsive to navigation to each marked node having the atypical style identifier in the DOM.

13. A non-transitory computer-readable medium having stored thereon computer-executable instructions that, in response to being executed by a computing device, cause the computing device to perform operations comprising:
   accessing a document object model (DOM) of a web page, the DOM having a plurality of nodes;
   automatically traversing each node in the DOM for a collection of at least two text attribute properties of each node in the DOM, the text attribute properties in the collection selected from the group consisting of foreground color, background color, font type, font size and font stylization;
   reducing each collection of text attribute properties to a style identifier whereby nodes in the DOM with identical text attribute properties have the same style identifier;
   calculating a point of interest value for each style identifier wherein the point of interest value comprises a relative uniqueness of each style identifier within the document as a whole; and
   comparing the point of interest value with a threshold uniqueness value wherein if the point of interest value exceeds the threshold uniqueness value then a point of interest text string in the DOM having the same style identifier is marked whereby a screen reader application is operable to navigate directly to the point of interest text string in the DOM and the screen reader broadcasts audio the point of interest text string.

14. The computer-readable medium of claim 13 wherein the point of interest value is determined from the group of factors consisting of an amount of text with the style identifier as a percentage of text for the entire DOM, a maximum text length value of a node having the style identifier, a minimum font size threshold, and a luminance contrast ratio of text color to background color.

15. The computer-readable medium of claim 14 wherein a valid range for the percentage of text for the entire DOM is between 1 and 30 percent whereby if the amount to text with the style identifier as a percentage of text for the entire DOM falls outside the valid range text strings in the DOM having the style identifier are excluded from being marked for the screen reader application.

16. The computer-readable medium of claim 14 wherein the maximum text length value of a node in the DOM having the style identifier is 250 characters whereby if any nodes with the styler identifier in the DOM have a text length value in excess of 250 characters then text strings in the DOM having the style identifier are excluded from being marked for the screen reader application.

17. The computer-readable medium of claim 14 wherein the minimum a luminance contrast ratio of text color to background color is 2 whereby if the style identifier includes a luminance contrast radio under 2 the style identifier is excluded from being marked for the screen reader application.

18. The computer-readable medium of claim 13 wherein the point of interest value is an algorithmic reduction of the collection of text attribute properties to a compact identifier, the algorithmic reduction performed by an operation selected from the group consisting of checksum functions and hash functions.

19. The computer-readable medium of claim 13 further comprising instructions to cause the screen reader application to announce the number of marked point of interest text string in the DOM.

20. The computer-readable medium of claim 13 further comprising instructions to cause the screen reader application to navigate to each marked point of interest text string in the DOM responsive to a predefined keystroke or keystroke combination.

\* \* \* \* \*